US010966364B2

(12) United States Patent
Barker et al.

(10) Patent No.: US 10,966,364 B2
(45) Date of Patent: Apr. 6, 2021

(54) WORK VEHICLE WITH ROW UNIT HAVING VARIABLE STEERING ANGLE

(71) Applicant: Deere & Company, Moline, IL (US)

(72) Inventors: Mark E. Barker, Johnston, IA (US); Cole L. Murray, Polk City, IA (US); Grant J. Wonderlich, Milan, IL (US); Michael E. Frasier, Iowa City, IA (US); Nathan A. Mariman, Davenport, IA (US)

(73) Assignee: DEERE & COMPANY, Moline, IL (US)

(*) Notice: Subject to any disclaimer, the term of this patent is extended or adjusted under 35 U.S.C. 154(b) by 104 days.

(21) Appl. No.: 16/121,348

(22) Filed: Sep. 4, 2018

(65) Prior Publication Data

US 2020/0068779 A1 Mar. 5, 2020

(51) Int. Cl.
*A01B 63/24* (2006.01)
*A01B 73/00* (2006.01)
*A01C 5/06* (2006.01)
*A01B 63/32* (2006.01)
*A01C 7/08* (2006.01)

(52) U.S. Cl.
CPC .............. *A01B 63/24* (2013.01); *A01B 73/00* (2013.01); *A01C 5/068* (2013.01); *A01B 63/32* (2013.01); *A01C 5/064* (2013.01); *A01C 7/08* (2013.01)

(58) Field of Classification Search
CPC .................................................... A01B 63/24
USPC ................................ 172/169, 286, 287, 383
See application file for complete search history.

(56) References Cited

U.S. PATENT DOCUMENTS 2,716,854 A * 9/1955 Scheibner ............ A01B 23/046
                                                                172/286
4,036,306 A * 7/1977 Kinzenbaw .......... A01B 15/145
                                                                172/287
4,404,918 A   9/1983 Whalen et al.
(Continued)

FOREIGN PATENT DOCUMENTS

WO   WO 2014/066650   5/2004

OTHER PUBLICATIONS

European Search Report issued in application No. 19187126.8 dated Mar. 13, 2020 (14 pages).
(Continued)

*Primary Examiner* — Gary S Hartmann
(74) *Attorney, Agent, or Firm* — Klintworth & Rozenblat IP LLP

(57) ABSTRACT

A row unit for a work vehicle includes a row unit frame with a closer frame. The closer frame defines a longitudinal axis and a transverse axis. The closer frame is supported for rotational movement about a substantially vertical steering axis to vary a turning angle between the longitudinal axis the vehicle longitudinal axis. The row unit includes a closer implement assembly with first and second closer implements and a walking beam construction. The first and second closer implements are attached to opposite areas of the walking beam construction. The walking beam construction is rotationally attached to the closer frame to support rotation of the closer implement assembly about the transverse axis. The first and second closer implements are configured to move ground material into a ground opening from opposites sides as the work vehicle moves across the field.

9 Claims, 13 Drawing Sheets

(56) References Cited

U.S. PATENT DOCUMENTS

| | | | | |
|---|---|---|---|---|
| 5,261,497 A * | 11/1993 | Snyder | ............... | A01B 59/04 |
| | | | | 172/284 |
| 5,813,472 A * | 9/1998 | Fixemer | ............ | A01B 69/004 |
| | | | | 172/26 |
| 6,530,334 B2 | 3/2003 | Hagny | | |
| 7,581,503 B2 | 9/2009 | Martin et al. | | |
| 7,849,932 B2 * | 12/2010 | Friggstad | ............ | A01B 69/003 |
| | | | | 172/278 |
| 8,267,021 B2 | 9/2012 | Mariman et al. | | |
| 8,640,785 B2 * | 2/2014 | Diaz | ................ | A01B 63/22 |
| | | | | 172/278 |
| 9,849,909 B2 * | 12/2017 | Wang | ............... | B62D 13/005 |
| 2002/0174813 A1 | 11/2002 | Hagny | | |
| 2012/0255475 A1 | 10/2012 | Mariman et al. | | |
| 2017/0079193 A1 | 3/2017 | Sheppard | | |
| 2017/0208736 A1 | 7/2017 | Schaffert et al. | | |

OTHER PUBLICATIONS

Extended European Search Report issued in application No. EP 19187126.8 dated May 29, 2020, in 12 pages.
Dawn Equipment, https://twitter.com/DawnEquipment/status/967163157096685569, Castering Feature of the Dawn Reflex Active Closing System, Feb. 23, 2018. (1 page) screen shot of video clip.
Dawn Equipment, https://www.dawnequipment.com/Dawn, RCX—Remote Hydraulic Closing System, 2018. (10 pages).
Clean Seed, CX6 Smart Seeder Goes Into Production article, Grainews, https://www.grainews.ca/machinery-shop/cx6-smart-seeder-goes-into-production, Jun. 1, 2016. (4 pages).

* cited by examiner

WORK VEHICLE WITH ROW UNIT HAVING VARIABLE STEERING ANGLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles, such as planters and seeders, and, more particularly, relates to a work vehicle with one or more rotatable row units having a variable steering angle.

BACKGROUND OF THE DISCLOSURE

Some work vehicles are configured for applying seed, fertilizer, and/or other particulate commodities to a field. Oftentimes, the work vehicle may include a metering system, which meters out a predetermined amount of the commodity for delivery to the soil. The work vehicle may also include a plurality of row units with ground engaging implements that are configured to receive the metered commodity and plant it within the soil.

More specifically, as the work vehicle moves across the field, the ground engaging implement(s) of a row unit may create a trench or furrow in the soil. The row unit may deliver the commodity into the trench. Then, the ground engaging implement(s) may move the soil over the commodity and bury the commodity under the surface of the soil.

SUMMARY OF THE DISCLOSURE

This disclosure provides a work vehicle with an improved row unit for improved planting, seeding, fertilizing, and related processes.

In one aspect, the disclosure provides a row unit for a work vehicle. The work vehicle defines a vehicle longitudinal axis. The row unit is configured to be attached to the work vehicle with a plurality of other row units for movement across a field. The row unit includes a row unit frame including a closer frame. The closer frame defines a longitudinal axis and a transverse axis. The closer frame is supported for rotational movement about a substantially vertical steering axis to vary a turning angle between the longitudinal axis of the closer frame and the vehicle longitudinal axis. Furthermore, the row unit includes a closer implement assembly that includes a first closer implement, a second closer implement, and a walking beam construction. The first closer implement and the second closer implement are attached to opposite areas of the walking beam construction. The walking beam construction is rotationally attached to the closer frame to support rotation of the closer implement assembly about the transverse axis. The first closer implement is configured to move ground material into a ground opening from one side as the work vehicle moves across the field. The second closer implement is configured to move ground material into the ground opening from an opposite side as the work vehicle moves across the field.

In another aspect, the disclosure provides a row unit for a work vehicle. The row unit is configured to be attached to the work vehicle with a plurality of other row units for movement across a field. The row unit includes a forward frame defining a forward longitudinal axis. The forward frame is configured to attach to a work vehicle frame of the work vehicle. The row unit also includes a closer frame defining a closer longitudinal axis. The closer frame is rotationally attached to the forward frame and is supported for rotational movement about a substantially vertical steering axis to vary a turning angle between the closer longitudinal axis and the forward longitudinal axis. Moreover, the row unit includes a closer implement attached to the closer frame. The closer implement is configured to move ground material into a ground opening as the work vehicle moves across the field. The closer frame is supported for movement relative to the forward frame between an unrestrained position and a restrained position. The closer frame, in the unrestrained position, is supported for rotational movement about the steering axis to vary the turning angle. The closer frame, in the restrained position, is restrained at a substantially fixed turning angle.

In a further aspect, the disclosure provides a work vehicle configured for movement across a field. The work vehicle includes a work vehicle frame and a plurality of row units that are attached to the work vehicle frame. At least one row unit includes a forward frame that supports an opener implement. The opener implement is configured to open a trench as the work vehicle moves across the field. The forward frame defines a forward longitudinal axis. The forward frame includes a retainer projection. The row unit also includes a closer frame defining a closer longitudinal axis. The closer frame includes a linkage and a trailing frame. The linkage is rotationally attached to the forward frame about a substantially vertical steering axis. The trailing frame is rotationally attached to the linkage about a lateral axis. The linkage is configured to rotate about the steering axis to vary a turning angle between the closer longitudinal axis and the forward longitudinal axis. The row unit additionally includes a closer implement assembly having a first closer implement, a second closer implement, and a walking beam construction. The first closer implement and the second closer implement are attached to opposite areas of the walking beam construction. The walking beam construction is rotationally attached to the trailing frame to support rotation of the closer implement assembly about a walking beam transverse axis. The first closer implement is configured to move ground material into the trench from one side as the work vehicle moves across the field, and the second closer implement is configured to move ground material into the trench from an opposite side as the work vehicle moves across the field. The trailing frame is supported for rotational movement about the lateral axis relative to the forward frame between an unrestrained position and a restrained position. The trailing frame, in the unrestrained position, is spaced apart from the retainer projection and supported for rotational movement about the steering axis to vary the turning angle. The trailing frame, in the restrained position, is configured to abut against the retainer projection to restrain the closer frame at a substantially fixed turning angle.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
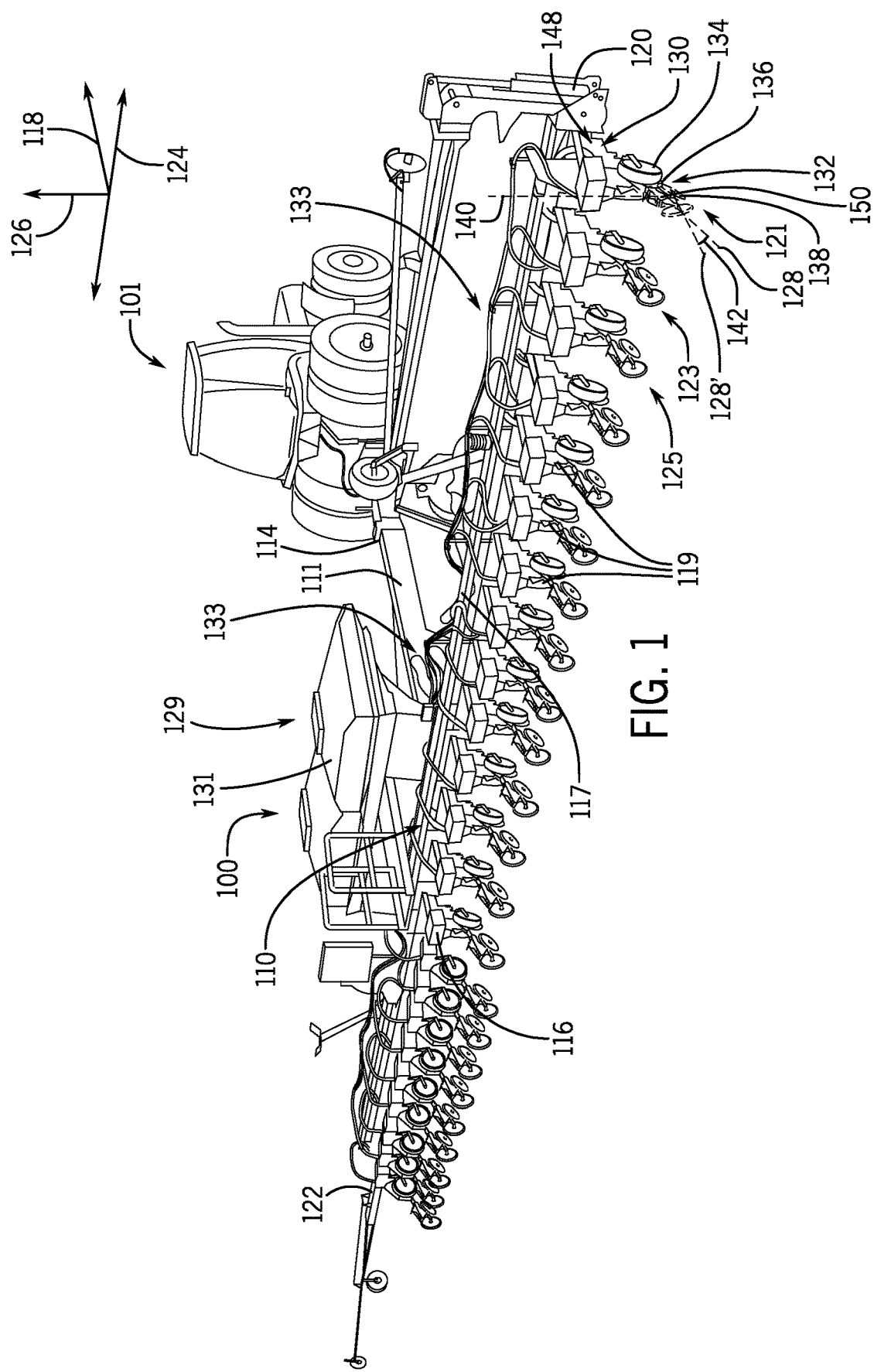
FIG. 1 is a rear perspective view of a towing work vehicle and a towed work vehicle with a plurality of row units according to example embodiments of the present disclosure.

The following describes one or more example embodiments of a row unit, a work vehicle with a plurality of row units, methods of manufacture of the same, and methods for operating the same, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction.

The following describes one or more example implementations of the disclosed work vehicle, as shown in the accompanying figures of the drawings described briefly above. Generally, the disclosed work vehicle includes at least one row unit with a row unit frame that supports one or more closer implements (e.g., a closer disc). The row unit frame supports the closer implements for rotation about a substantially vertical axis (i.e., steer axis). Accordingly, the closer implements may turn to follow and close a non-linear trench, furrow, etc. The closer implements may also turn about the vertical axis (i.e., a steering axis) to more closely follow trenches that extend along a side sloping hill.

The row unit of the present disclosure may include additional features that provide certain advantages. For example, the row unit may include a walking beam construction that couples the closer implements and allows the closer implements to rotationally move as a unit relative to the ground surface, e.g., to overcome obstacles and avoid jamming of the closer implements. Also, the row unit may include a retainer that restrains the closer implements at a predetermined steering angle and that selectively releases the closer implements for rotation about the steering axis. This may provide convenience, for example, when stowing and transporting the row unit. Additionally, the row unit may include one or more features that bias the row unit toward a predetermined turn angle (e.g., toward a straight-ahead or zero degree turn angle) to improve function of the closer implements. Still further, the row unit may include features that actuate to automatically change the steering angle of the closer implements. In some embodiments, a sensor unit may be included for detecting how the trench turns ahead of the closer implements, and the actuator may actuate the closer implements accordingly. Moreover, the row unit may include features that automatically change the height of the closer implements relative to the ground surface and/or that automatically vary the downforce applied by the closer implements onto the ground surface.

Thus, the row unit of the present disclosure may reliably and accurately close the trench during planting and other related operations. Furthermore, the row unit may provide convenient use as will be discussed.

FIG. 1 illustrates a work vehicle 100 according to example embodiments of the present disclosure. The work vehicle 100 may be towed by another vehicle, such as a tractor 101. Thus, the work vehicle 100 may be a towed work vehicle. In other embodiments, the work vehicle 100 of the present disclosure may be a self-propelled vehicle. In some embodiments, the work vehicle 100 may be a planter or seeder configured for agricultural work. It will be appreciated that the illustrated work vehicle 100 is an example embodiment. One or more features of the present disclosure may be included on a different work vehicle without departing from the scope of the present disclosure.

The work vehicle 100 includes a front end 114 and a rear end 116. The work vehicle 100 also includes a first side 120 and a second side 122. The work vehicle 100 defines a longitudinal axis 118, which may extend between the rear end 116 and the front end 114. It will be appreciated that a straight-ahead travelling direction of the work vehicle 100 may extend along the longitudinal axis 118 from the rear end 116 toward the front end 114. The work vehicle 100 further defines a lateral axis 124 extending between the first side 120 and the second side 122. Furthermore, the work vehicle 100 defines a vertical axis 126, which extends normal to the longitudinal axis 118 and the lateral axis 124. The vertical axis 126 may extend normal to a ground surface (soil, earth, etc.). As will be discussed, the work vehicle 100 may, at times, turn substantially about the vertical axis 126 to navigate across a field. Thus, the vertical axis 126 may be referred to as a steering axis or a yaw axis.

The work vehicle 100 may include a frame structure 110 (i.e., a chassis). The frame structure 110 may include an elongate tongue 111. The tongue 111 may be a rigid or telescoping beam that extends along the longitudinal axis 118. The tongue 111 may include a towing package for hitching and unhitching from the tractor 101. The frame structure 110 may further include a lateral beam 117. The lateral beam 117 may be a rigid member that extends along the lateral axis 124. The lateral beam 117 may be fixed to the tongue 111 of the frame structure 110, proximate the rear end 116 of the work vehicle 100.

The work vehicle 100 may also include a commodity system 129 with at least one tank 131 and a commodity distribution system 133. The tank 131 may contain a bulk amount of a commodity (e.g., seed, fertilizer, etc.), and the distribution system 133 may include hoses, lines, etc. that are configured to distribute the commodity from the tank 131 to a plurality of row units 119. The commodity system 129 may also include a metering system that meters out the commodity at a predetermined rate.

The row units 119 may be attached to the lateral beam 117 of the frame structure 110. The row units 119 may branch rearward from the lateral beam 117 to define much of the rear end 116 of the work vehicle 100. The plurality of row units 119 may be substantially similar to each other and may include a first row unit 121, a second row unit 123, a third row unit 125, and so on, across the rear end 116 and along the lateral axis 124. In some embodiments, the row units 119 may be configured to: 1) open a trench, furrow, or other ground opening as the work vehicle 100 moves through a field; 2) deposit seed, fertilizer, or other commodity within the opening; and 3) close the ground opening by moving soil and/or other materials back into the opening to thereby plant the commodity therein.

The first row unit 121 may be a representative example of the other row units 119. The first row unit 121 may include a row unit frame 130. The row unit frame 130 may include a plurality of strong and rigid brackets, linkages, fasteners, etc., that support other components that will be discussed. The row unit frame 130 may be attached to the frame structure 110. For example, the row unit frame 130 may be attached to the lateral beam 117 and may extend rearward therefrom.

The first row unit 121 may also include a ground system 132. The ground system 112 may include one or more gauge wheels 134 that are attached to the row unit frame 130. The ground system 132 may also include one or more ground engaging implements that move soil (e.g., to create and close a trench as the vehicle 100 moves across the field). Specifically, in some embodiments, the ground system 132 may include one or more opener implements 136 (e.g., opener discs or wheels) and one or more closer implements 138 (i.e., closer discs or wheels). Generally, as the vehicle 100 travels, the opener implements 136 may open a trench in the soil, seed may be deposited in the open trench, and the closer implements 138 may close the trench over the seed. Additionally, the gauge wheels 134 may ride on the surface of the ground as the vehicle 100 travels, maintaining a set vertical position of the row unit 121 above the ground. Thus, the gauge wheels 134 may maintain a set depth of the furrow created by the opener implements 136.

At least part of the first row unit 121 may be supported for rotational movement about a substantially vertical axis of rotation 140 relative to other portions of the work vehicle 100. In particular, the closer implements 138 may be supported for travel along the ground along a curved path because components are supported for rotation about the axis 140. Thus, as the work vehicle 100 turns within the field and the opener implements 136 create a curved trench for the seed, fertilizer, etc. The closer implements 138 may follow the curved trajectory of the trench and effectively close the trench over the seed, fertilizer, etc.

In some embodiments, the axis of rotation 140 of the row unit 121 may be parallel to the vertical axis 126 of the work vehicle 100. In other embodiments, the axis of rotation 140 may be "substantially parallel," meaning that the axis of rotation 140 intersects the vertical axis 126 but allows the row unit 121 to pivot as the work vehicle 100 turns within the field and/or as the trench or other ground opening curves and changes trajectory through the field. In some embodiments, the axis of rotation 140 is within approximately thirty-five degrees (35°) of the vertical axis 126.

Additionally, in some embodiments, the first row unit 121 may be supported for rotational movement about the axis 140 relative to the lateral beam 117 of the work vehicle 100. In additional embodiments, the row unit 121 may include a forward assembly 148 and a closer assembly 150. The forward assembly 148 may be attached to the lateral beam 117 of the work vehicle 100, and the forward assembly 148 may support the gauge wheels 134 and the opener implements 136. The closer assembly 150 may support the closer implements 138 of the row unit 121. The closer assembly 150 may be attached to the forward assembly 148 and may be disposed rearward with respect thereto. The closer assembly 150 may be pivotally coupled to the forward assembly 148 for relative rotation about the axis of rotation 140.

As represented in FIG. 1, the closer assembly 150 may turn between a first position (shown in solid lines) and a second position (shown in phantom). In some embodiments, the first position may be a "straight-ahead position" wherein a longitudinal axis 128 of the closer assembly 150 is oriented substantially normal to the lateral beam 117. In contrast, the longitudinal axis 128 in the second "turned" position may be disposed at an angle relative to the lateral beam 117. It will be appreciated that the closer assembly 150 may be configured for turning clockwise and counterclockwise (in opposite directions) about the axis of rotation 140. As the row unit 121 turns about the axis 140, a turning angle 142 of the closer assembly 150 may vary.

Referring now to FIGS. 2-5, the first row unit 121 will be discussed in further detail according to example embodiments. It will be understood that the first row unit 121 may be substantially similar to the second row unit 123, the third row unit 125, and/or any of the other row units 119.

The row unit 121 may generally include the forward assembly 148 and the closer assembly 150, which may be rotationally attached at a rotational joint 192. Accordingly, the closer assembly 150 may rotate about the substantially vertical steering axis 140.

In some embodiments, the forward assembly 148 may include a forward frame 144 with a linkage 180. The linkage 180 may be a casting with a bar-like forward end 181. The forward end 181 may include one or more projections, through-holes, or other features used for attaching to other members of the forward frame 144 of the forward assembly 148. Furthermore, the linkage 180 may define a forward longitudinal axis 183. In some embodiments, the forward longitudinal axis 183 may be substantially horizontal and may be substantially parallel to the longitudinal axis 118 of the work vehicle 100. The linkage 180 may further include a rear body 184 that defines a receiver tube 186 that is centered about the axis of rotation 140. The receiver tube 186 may partly define the rotational joint 192

Figure 2:
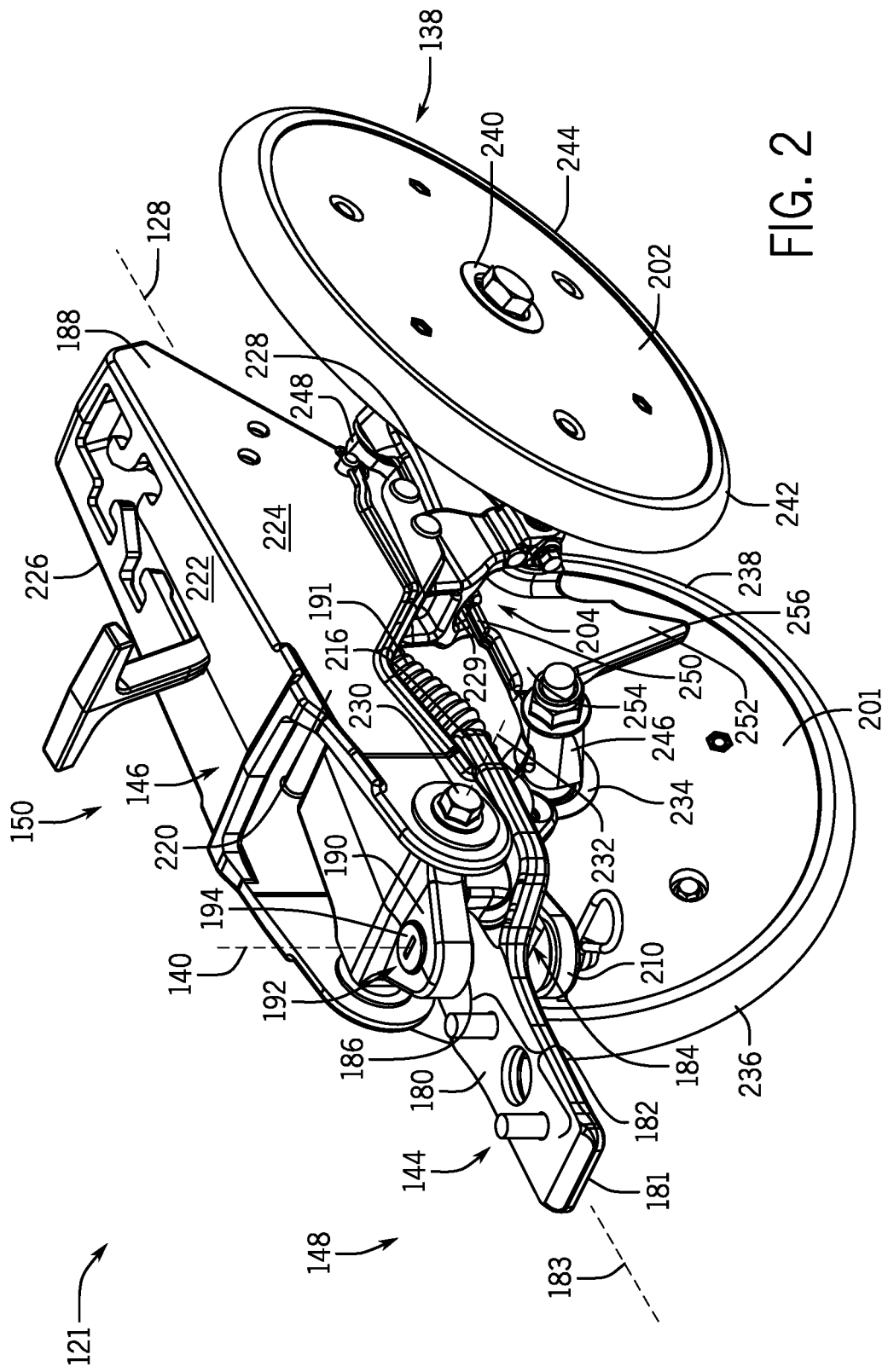
FIG. 2 is a perspective view of a row unit of the work vehicle of FIG. 1 according to example embodiments of the present disclosure.
Figure 4:
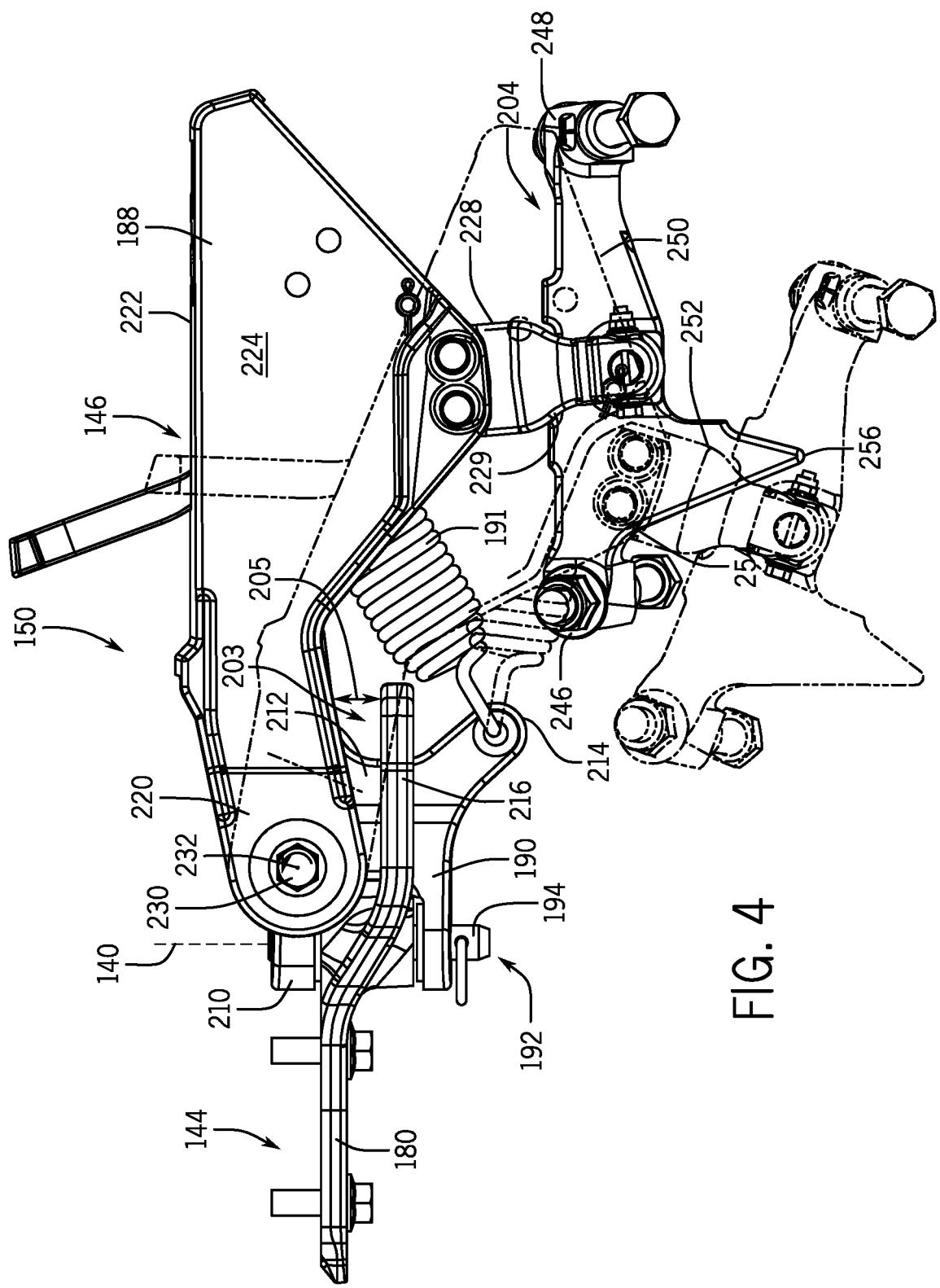
FIG. 4 is a side view of a portion of the row unit shown in an unrestrained position and in a restrained position.
Figure 5:
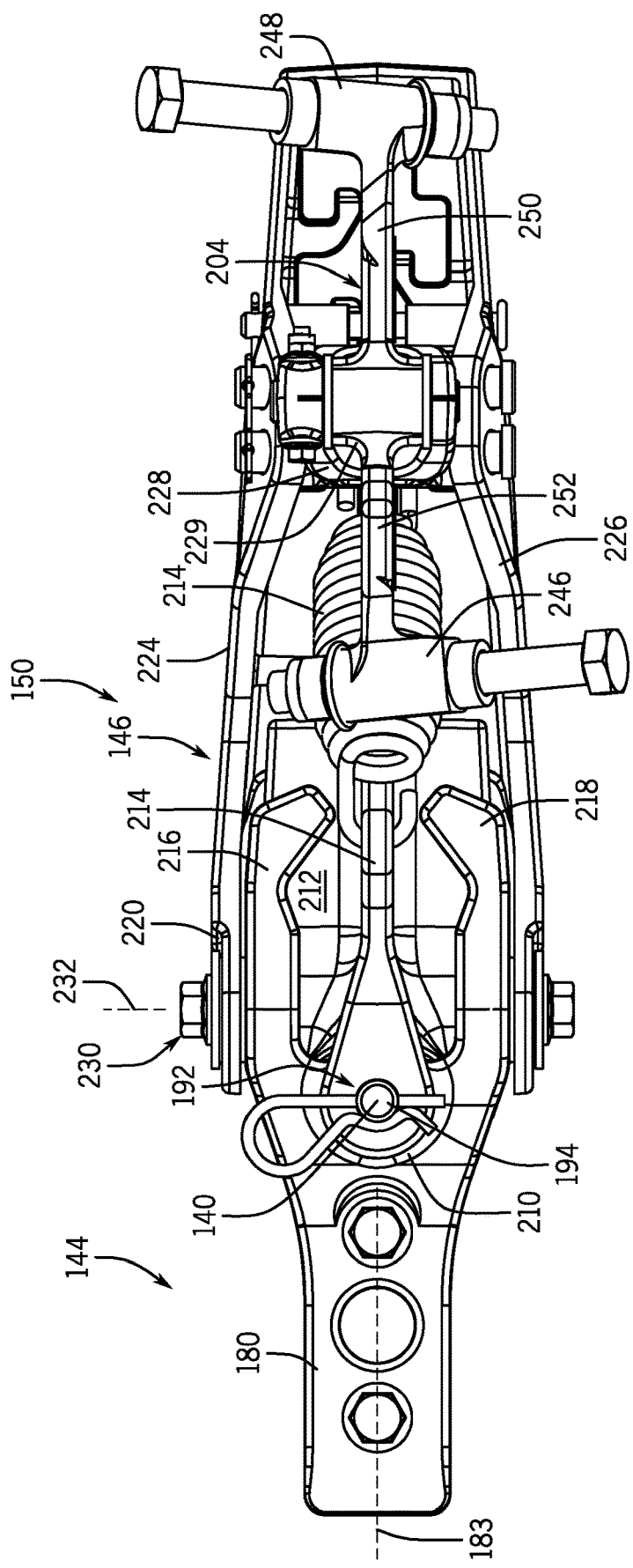
FIG. 5 is a bottom view of the portion of the row unit of FIG. 4.

As shown in FIGS. 2, 4, and 5, the linkage 180 of the forward frame 144 may also include a first projection 216 and a second projection 218. The first projection 216 and the second projection 218 may be elongate tines or tangs that extend generally rearward from opposite sides of the rear body 184. As shown in FIG. 5, the first and second projections 216, 218 may be disposed on opposite sides of the axis of rotation 140 and may extend rearward therefrom. Also, the first and second projections 216, 218 may curve inward toward the longitudinal axis 183 at their terminal ends.

Referring back to FIG. 2, the closer assembly 150 will now be discussed in detail according to example embodiments. For example, the closer assembly 150 may include a closer frame 146 (i.e., a rear frame). The closer frame 146 may include a linkage 190 and a trailing frame 188. The linkage 190 may be rotationally attached to the linkage 180 of the forward frame 144 at the rotational joint 192. Also, the trailing frame 188 may be moveably coupled to the linkage 190 as will be discussed.

The linkage 190 may be a rigid member constructed from metal in some embodiments. The linkage 190 may be manufactured from a casting process in some embodiments. The linkage 190 may include a forked end 210, a relatively flat body 212, and a projection 214. The projection 214 may project downward from the body 212 from a side that is opposite the forked end 210. The forked end 210 may be attached to the forward frame 144 to define the rotational joint 192. The rotational joint 192 may also include a pin 194 that is received in the forked end 210 of the linkage 190 and within the receiver tube 186 of the forward frame 144. Thus, the linkage 190 (and the rearward components of the closer assembly 150) may rotate about the axis of the pin 194 (i.e., the axis of rotation 140) to vary the steering angle 142 of the closer assembly 150. In some embodiments, this may define a single axis of rotation (i.e., the axis 140).

The trailing frame 188 may be a rigid member constructed from metal in some embodiments. The trailing frame 188 may be saddle-shaped and may include a top side 222, a first lateral side 224, and a second lateral side 226. The trailing frame 188 may also include a forward attachment portion 220 that protrudes forward from the first lateral side 224 and the second lateral side 226. The forward attachment portion 220 may receive the forked end 210 of the linkage 190 and may be attached thereto. For example, the forward attachment portion 220 may be pivotally attached to the forked end 210 at a lift joint 230 for rotation about a first lateral axis 232.

Furthermore, the trailing frame 188 may include a drop member 228. The drop member 228 may be a rigid member constructed from metal in some embodiments. The drop member 228 may be forked. The drop member 228 may also be fixed to the first lateral side 224 and the second lateral side 226. The drop member 228 may define an abutment member 229. The abutment member 229 may be defined on a downward-facing surface between the forks of the drop member 228.

The closer assembly 150 may additionally include a biasing member 191. The biasing member 191 may be a helical spring in some embodiments. The biasing member 191 may be a tension spring in some embodiments. The biasing member 191 may be attached at one end to the underside of the trailing frame 181. The biasing member 191 may also be attached at the opposite end to the projection 214 of the linkage 190. The biasing member 191 may bias and pull the trailing frame 188 toward the linkage 190 as the trailing frame 188 pivots about the first lateral axis 232.

Additionally, the closer assembly 150 may include a closer implement assembly 235. The closer implement assembly 235 may generally include the closer implement(s) 138 mentioned above with respect to FIG. 1. More specifically, in some embodiments, the closer implement assembly 235 may include a first closer disc 201 and a second closer disc 202. The closer implement assembly 235 may also include a walking beam construction 204, which is attached to the first and second closer discs 201, 201, and which is also attached to the closer frame 146.

The first closer disc 201 may include a hub 234, which is attached to a first mount 246 (a first area or first end) of the walking beam construction 204. The second closer disc 202 may include a hub 240 that is attached to a second mount 248 (a second area or second end) of the of the walking beam construction 204. The walking beam construction 204 may also include an elongate beam 250 that extends between the first mount 248 and the second mount 250.

The walking beam construction 204 may be received between the open, forked end of the drop member 228 of the trailing frame 188. For example, an intermediate area of the beam 250 (e.g., a midpoint between the first and second mounts 246, 248) may be rotationally attached to the forked end of the drop member 228 of the closer frame 146. As such, the closer implement assembly 235 (the first and second discs 201, 202 and the walking beam construction 204) may rotate as a unit relative to the drop member 228 about a horizontal axis of rotation that extends laterally.

As shown, the first closer disc 201 (the leading disc) may be spaced longitudinally forward from the second closer disc 202, and the walking beam construction 204 may extend substantially along the longitudinal axis 128. Also, the first and second closer discs 201, 202 may be disposed on opposite sides of the longitudinal axis 128. Furthermore, the first and second closer discs 201, 202 may be tilted and angled from top to bottom such that the respective bottom edge is disposed closer to the longitudinal axis 128 than the opposing top edge.

Figure 3:
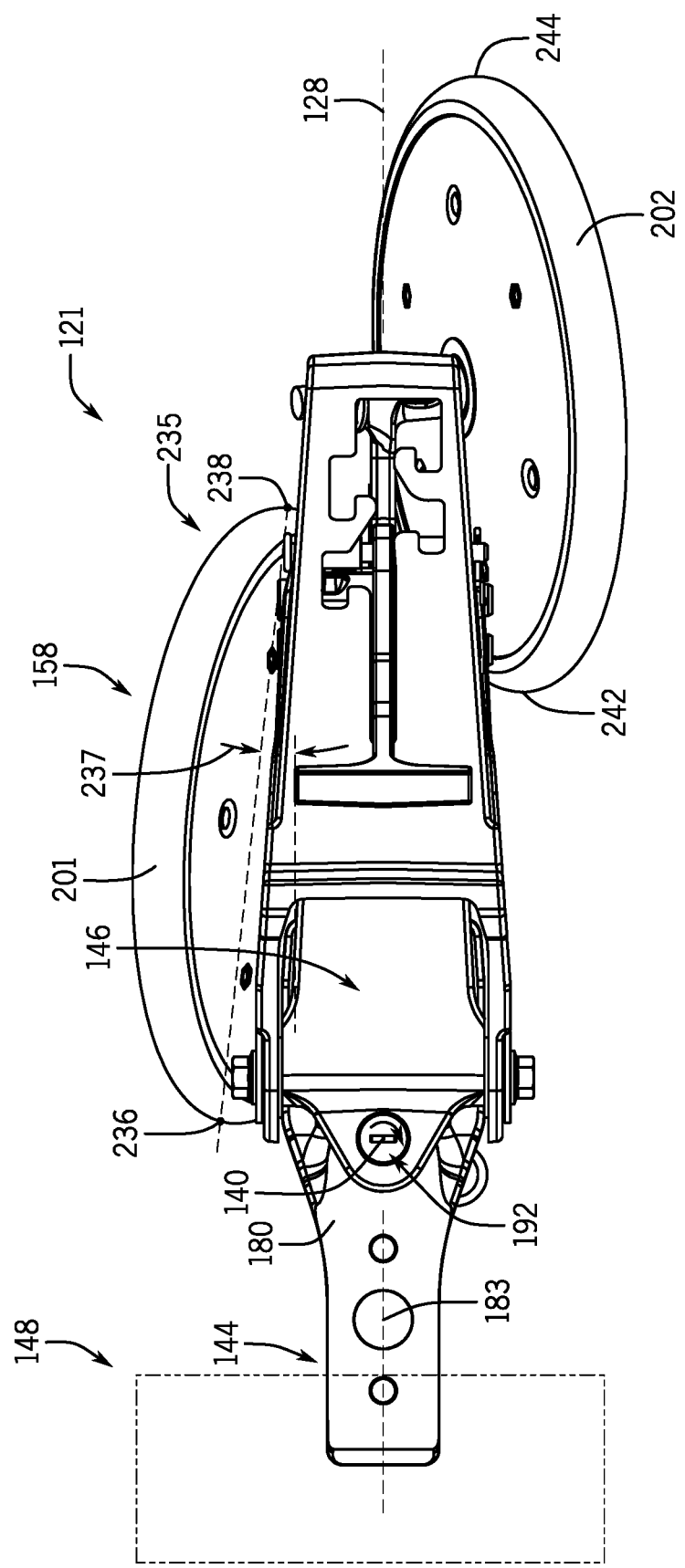
FIG. 3 is a top view of the row unit of FIG. 2.

Additionally, as shown in FIG. 3, the first closer disc 201 may be disposed at a so-called "toe-out" angle 237 such that a leading edge 236 is disposed further away from the longitudinal axis 128 than a trailing edge 238 thereof. In contrast, a leading edge 242 and a trailing edge 244 of the second closer disc 202 may be disposed at a substantially equal distance from the longitudinal axis 128.

During operation, the opener implements 136 may open a trench into which the row unit 121 deposits the seed, fertilizer, or other commodity. The first closer disc 201 may push earth, soil, etc. into the trench from one side, and the second closer disc 202 may push earth, soil, etc. into the trench from the opposite side to bury the commodity therein and to close the trench.

Because the first closer disc 201 is disposed at the toe-out angle 237, the first closer disc 201 may continuously tend to pull the closer assembly 150 laterally to some degree. For example, a portion of the first closer disc 201 may be received within the trench, but the toe-out angle 237 may cause the first closer disc 201 to continuously climb out of the trench while it moves material into the trench. Accordingly, the toe-out angle 237 of the first closer disc 201 may act to maintain the closer assembly 150 centered over the trench and/or in position to effectively move material into the trench.

Furthermore, the work vehicle 100 may move straight ahead in many cases such that the open trench extends along a substantially straight trajectory. However, the work vehicle 100 may turn and travel through a curve such that the trench curves along a non-linear trajectory. Regardless, the closer assembly 150 may rotate about the vertical axis of rotation 140 to thereby follow the curved trajectory of the open trench. Accordingly, the closer assembly 150 may remain in position to effectively close the trench.

In addition, if the first closer disc 201 impacts an obstacle (e.g., a rock, stump, root, etc.), the closer implement assembly 235 may rotate. Specifically, the impact may cause rotation of the walking beam construction 250, lifting the first closer disc 201 off the ground and driving the second closer disc 202 toward the ground. Once the first closer disc 201 has cleared the obstacle, the walking beam construction 250 may rotate in the reverse direction causing the first closer disc 201 to move back toward the ground and the second closer disc 202 to move away from the ground. Accordingly, the closer implement assembly 235 may "walk over" the obstacle due to rotation of the walking beam construction 250.

Furthermore, in some embodiments, the closer assembly 150 may include the abutment member 229. The abutment member 229 may be fixed to the closer frame 146 and may abut against the closer implement assembly 235 to limit its range of rotational movement. In some embodiments, the abutment member 229 may be an underside surface between the forks of the forked drop member 228. The abutment member 229 may be configured to abut against the opposing top surface of the beam 250 of the walking beam construction 204. For example, as the first closer disc 201 raises from the ground and the second closer disc 202 rotates toward the ground, the beam 250 may eventually abut against the abutment member 229 of the drop member 228. Thus, the abutment member 229 may limit over-rotation (e.g., preventing the closer implement assembly 235 from moving over center). Accordingly, the closer implement assembly 235 may remain in position such that the closer discs 201, 202 can effectively close the trench.

Moreover, the closer implement assembly 235 may include a projection 252 that is configured to move (push) an obstacle out of the way. As shown in FIG. 2, the projection 252 may include an attachment portion 254, which is fixed to the beam 250, and an opposing terminal end portion 256. The attachment portion 254 may be attached at an intermediate point of the beam 250 between the first mount 246 and the area where the beam 250 is attached to the drop member 228. The projection 252 may be integrally connected with the beam 250 so as to be unitary therewith. Furthermore, projection 252 may project downward from the beam 250 toward the ground. Also, the projection 252 may be tapered (e.g., triangular) with the attachment portion 254 being wider than the pointed terminal end portion. As the closer assembly 150 travels, the projection 252 may impact an obstacle, such as a root, a rock, etc. The projection 252 may, in turn, push the obstacle away from the closer implement assembly 235. In addition or instead, the impact may rotate the closer implement assembly 235, pushing the first closer disc 201 upward and driving the second closer disc 202 toward the ground. Thus, the obstacle is unlikely to jam between the closer discs 201, 202 or otherwise inhibit closing of the trench.

As noted above, the trailing frame 188 may be rotationally attached to the linkage 190 at the lift joint 230. Accordingly, the trailing frame 188 may be rotated at the lift joint 230 to vary the height of the first and second closer discs 201, 202 and/or to vary the force the closer discs 201, 202 impart to the ground. The biasing member 191 may bias the trailing frame 188 toward the linkage 190 (i.e., toward a lowered position).

The row unit 121 may further include a retainer 203. The retainer 203 may comprise the first projection 216 and the second projection 218 of the linkage 180 of the forward assembly 148. The retainer 203 may also comprise the first lateral side 224 and the second lateral side 226 of the trailing frame 188. The retainer 203 may additionally comprise the biasing member 191. As represented in FIG. 4, the closer assembly 150 may rotate relative to the linkage 190 (and the linkage 180) between an unrestrained position (shown in solid lines) and a restrained position (shown in phantom).

In the unrestrained position, the closer discs 201, 202 may push on the ground, causing the trailing frame 288 to rotate away from the linkage 190 against the biasing force provided by the biasing member 191. Also, in this unrestrained position, the first and second lateral sides 224, 226 of the trailing frame 188 may be spaced apart at a clearance distance 205 away from the first and second projections 216, 218 of the forward frame 144.

In contrast, in the restrained position shown in phantom in FIG. 4, the closer discs 201, 202 may be raised from the ground. For example, the entire closer assembly 150 may be lifted from the ground and stowed to facilitate transport of the work vehicle 100. Since the closer discs 201, 202 are removed from the ground, the biasing member 191 may bias the trailing frame 188 toward the linkage 190. This causes the lateral sides 224, 226 to move over the first and second projections 216, 218 of the linkage 180. Accordingly, abutment between the lateral sides 224, 226 and the projections 216, 218 may limit rotation of the trailing frame 188 about the vertical axis of rotation 140. In some embodiments, when in the restrained position, the closer assembly 150 may be disposed at a substantially fixed steering angle relative to the forward assembly 148 and/or other portions of the work vehicle 100. For example, in the restrained position, the closer assembly 148 may be disposed at a straight ahead, zero-degree (0°) turning angle between the longitudinal axis 128 of the closer assembly 150 and the longitudinal axis 183 of the forward assembly 148.

It will be appreciated that the retainer 203 may be configured differently from the illustrated embodiments without departing from the scope of the present disclosure. For example, in an additional embodiment, the projections 216, 218 may be attached to and may project forward from the closer frame 146 toward the forward frame 144. When in the restrained position, the projections 216, 218 may abut the forward frame 144 to limit rotation of the closer frame 146 and retain the closer assembly 150 at a substantially fixed steering angle.

Accordingly, the retainer 203 may retain the closer assembly 150 in place. This may be useful, for example, when transporting the work vehicle 100.

Figure 6:
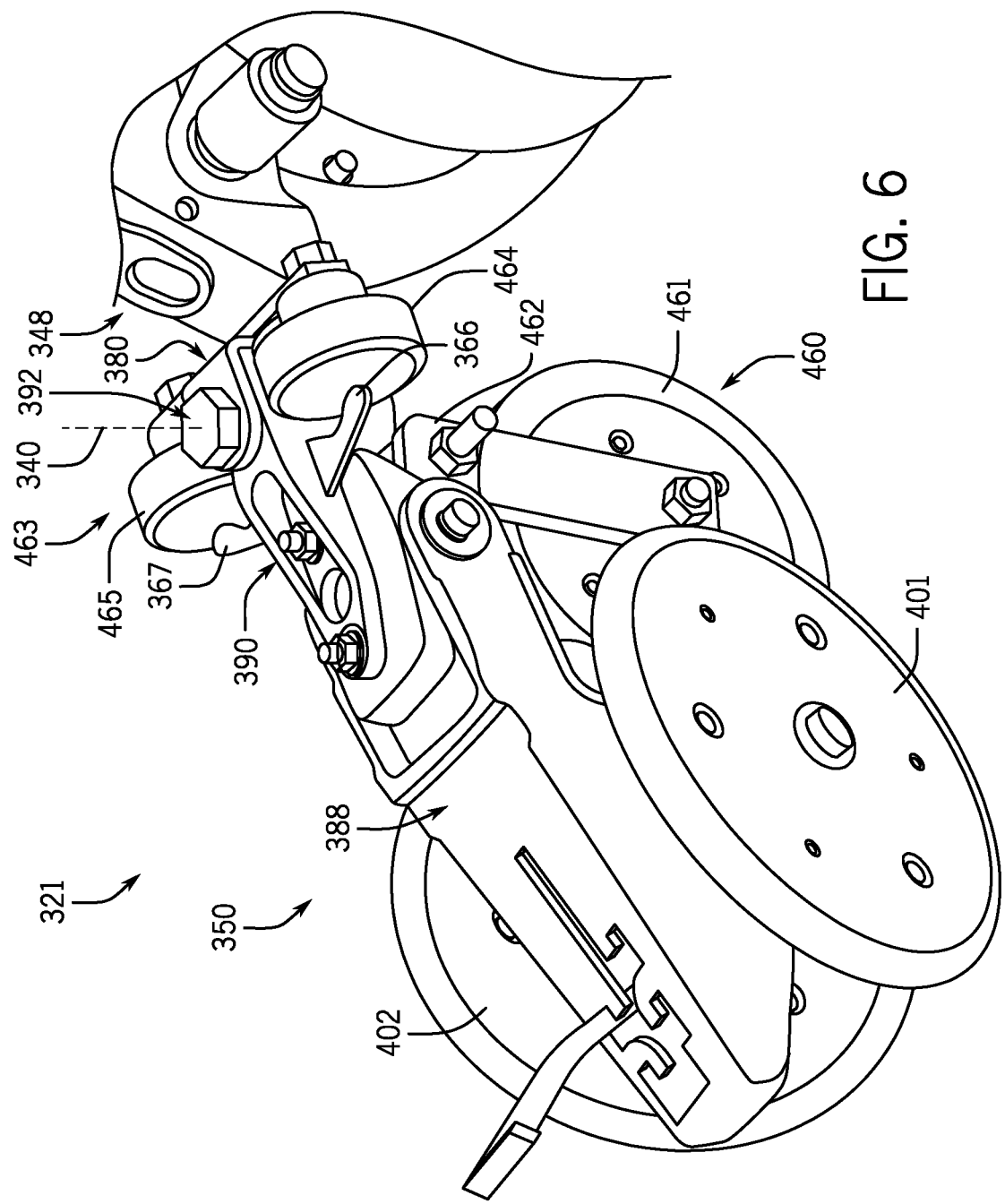
FIG. 6 is a perspective view of the row unit according to additional embodiments of the present disclosure.
Figure 7:
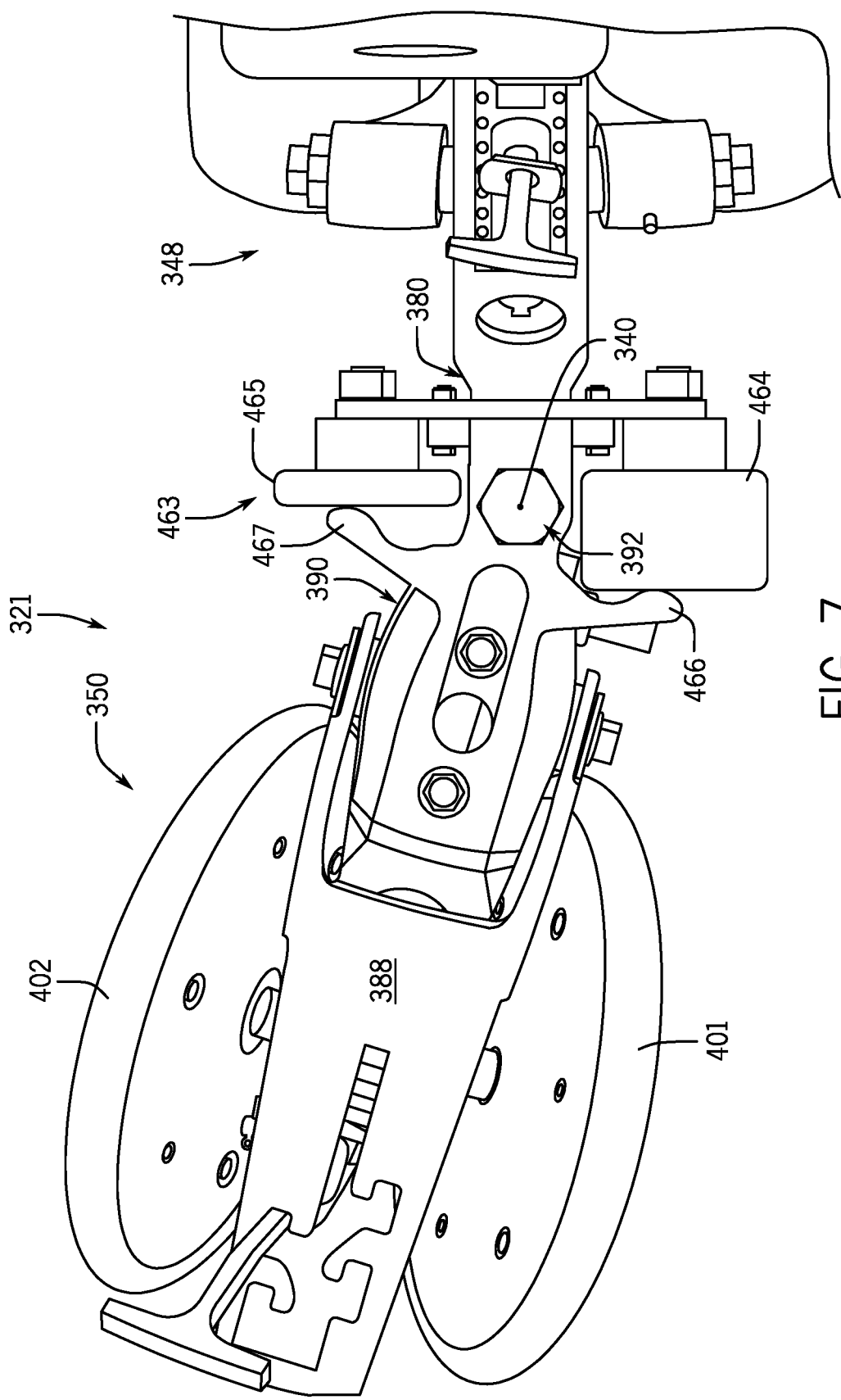
FIG. 7 is a top view of the row unit of FIG. 6.

Referring now to FIGS. 6 and 7, the row unit 321 of the present disclosure will be discussed according to additional embodiments. The row unit 321 of FIGS. 6 and 7 may be substantially similar to the embodiments of FIGS. 1-5 except as noted below. Components of FIGS. 1-5 may also be shared and combined with those discussed below. Components that correspond to those of the embodiments of FIGS. 1-5 will be indicated with corresponding reference numbers increased by 200.

As shown, the row unit 321 may include the forward assembly 348 and the closer assembly 350 attached at the rotational joint 392. Accordingly, the closer assembly 350 may rotate relative to the forward assembly 348 about the vertical axis of rotation 340. Specifically, the linkage 380 of the forward assembly 348 may be rotationally attached at the rotational joint 392 to the linkage 390 of the closer assembly 350.

The linkage 390 may include a first projection 466 and a second projection 467. The first projection 466 may be integrally attached to and may project laterally away from the linkage 390. The second projection 467 may be symmetrically disposed and attached to the opposite side of the linkage 390.

The trailing frame 388 of the closer assembly 350 may be rotationally attached to the linkage 390 as discussed above. As shown, the first and second closer discs 401, 402 may be attached to opposite sides of the trailing frame 388. Also, the first and second closer discs 401, 402 may be aligned longitudinally (FIG. 7).

The row unit 321 may further include a sensor assembly 460. The sensor 460 may detect a change in trajectory of the trench in order to move the closer assembly 350 and change the steering angle of the closer assembly 350 about the axis 340.

In some embodiments, the sensor 460 may include a wheel 461 and a support 462 that attaches the wheel 461 to the row unit 321. The wheel 461 may be disposed between the first and second closer discs 401, 402 and may be configured to ride within the trench. Also, the support 461 may include linkages, brackets, fasteners, biasing members, springs, and other accessories that extend upward from the axle of the wheel 461 and that attaches to an actuator 463. In some embodiments, the wheel 461 and the support 461 may be supported for rotation about the axis of rotation 340, independent of the closer assembly 350 and the forward assembly 348.

The actuator 463 may be of a variety of types without departing from the scope of the present disclosure. For example, the actuator 463 may be a pneumatic actuator, which includes a valve system, fluid lines, etc. that are supported on the forward assembly 348. The actuator 463 may also include a first inflatable bladder 464 and a second inflatable bladder 465. In some embodiments, the support 462 of the sensor may be operably connected to one or more valves of the actuator 463.

As such, when the support 462 rotates one way about the axis of rotation 340, one bladder 464, 465 inflates and the other deflates. In FIG. 7, the first bladder 464 is inflating to push the projection 466 and the rest of the closer assembly 350 about the axis of rotation 340. In contrast, when the support 462 rotates the opposite way, the second bladder 465 inflates, pushing the projection 467 and the rest of the closer assembly 350 in the opposite direction about the axis of rotation 340.

Accordingly, the steering angle of the closer assembly 350 may be actively controlled according to the input provided by the sensor assembly 460. In other words, the wheel 461 may rotate about the axis 340 as the trench curves and changes trajectory. The closer assembly 350 may receive this input to rotate the closer assembly 350 about the axis 340 accordingly.

Figure 8:
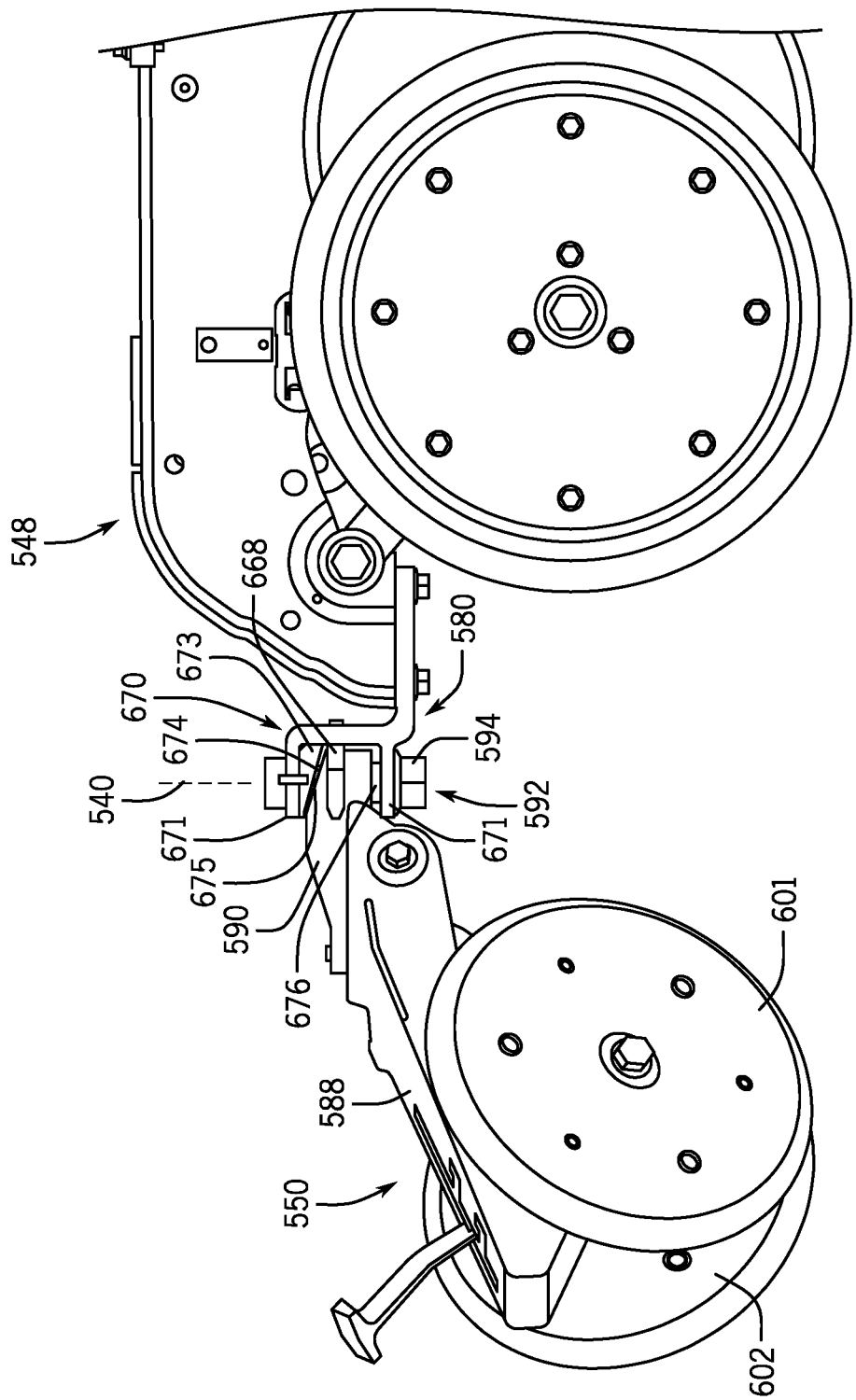
FIG. 8 is a side view of the row unit according to additional embodiments of the present disclosure.
Figure 9:
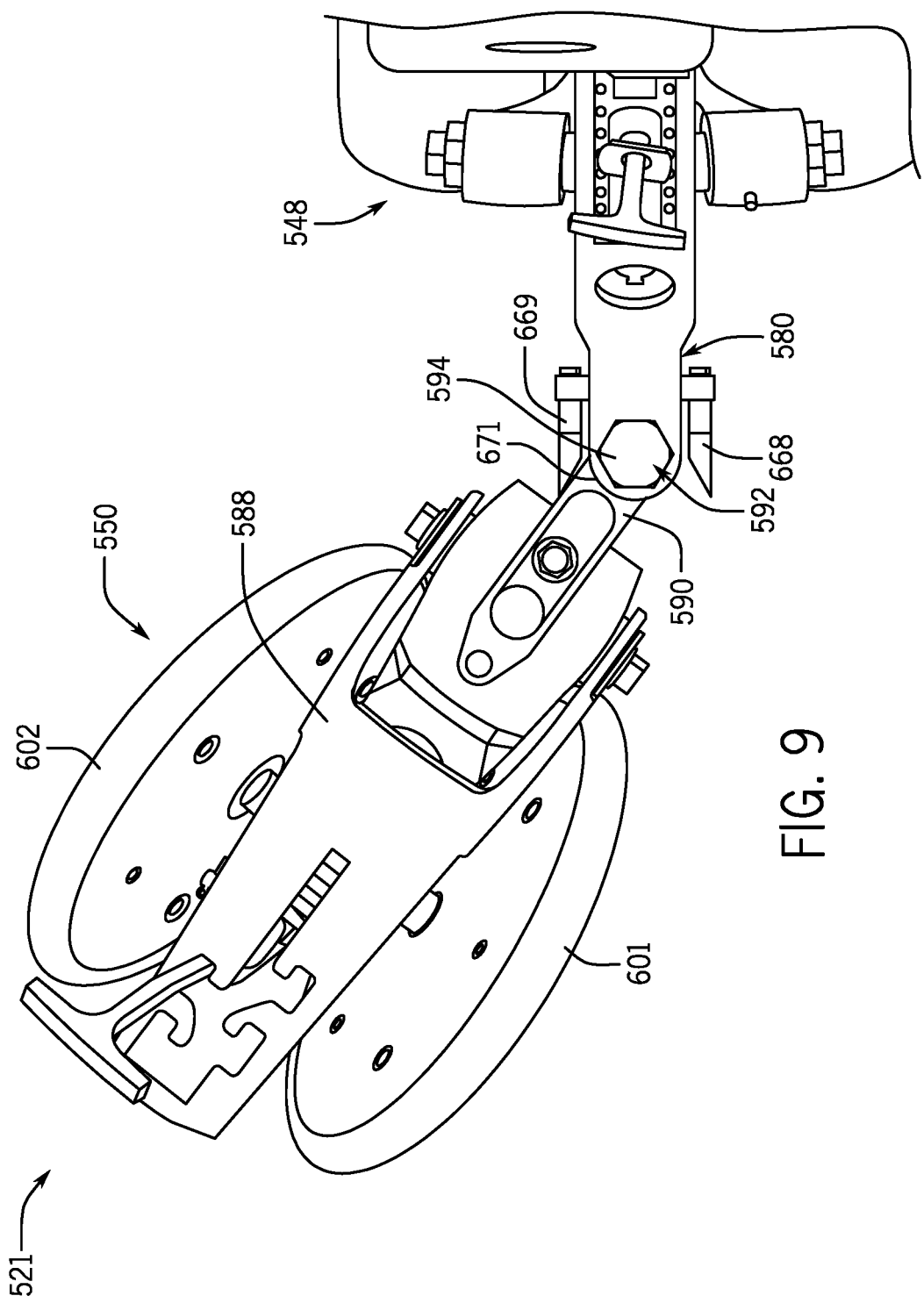
FIG. 9 is a top view of the row unit of FIG. 8.

Referring now to FIGS. 8 and 9, the row unit 521 of the present disclosure will be discussed according to additional embodiments. The row unit 521 of FIGS. 8 and 9 may be substantially similar to the above-described embodiments except as noted below. Components discussed above may also be combined with those discussed below. Components that correspond to those of the embodiments of FIGS. 6 and 7 will be indicated with corresponding reference numbers increased by 200.

As shown, the row unit 521 may include the forward assembly 548 and the closer assembly 550 attached at the rotational joint 592. Accordingly, the closer assembly 550 may rotate relative to the forward assembly 548 about the vertical axis of rotation 540. Specifically, the linkage 580 of the forward assembly 548 may be rotationally attached at the rotational joint 592 to the linkage 590 of the closer assembly 550.

The linkage 580 may include a forked end 670 with an upper member 671 and a lower member 672. The linkage 580 may also include a first stop 668 and a second stop 669. The first and second stops 668, 669 may be posts that project rearward from the linkage 580.

The closer assembly 550 may include the linkage 590. The linkage 590 may include a first ramp surface 674. The closer assembly 550 may further include the trailing frame 588. The first and second closer discs 601, 602 may be attached to the trailing frame 588.

The rotational joint 592 may include the pin 594, which extends through the upper member 671 and the lower member 672 of the forked end 670 of the linkage 580 as well as the linkage 590. The rotational joint 592 may further include a ramp member 673. The ramp member 673 may include a second ramp surface 675. The second ramp surface 675 may be inverse to the first ramp surface 674 of the linkage 590 in some embodiments. Moreover, the rotational joint 592 may include a biasing member 676. The biasing member 676 may be a spring, such as a wave spring that extends about the pin 594 between the lower member 672 of the linkage 580 and the linkage 590.

The second ramp surface 675 may abut and may oppose the first ramp surface 674. As the closer assembly 550 rotates about the axis 540, the second ramp surface 675 may cam against the first ramp surface 674, causing compression of the biasing member 676. The biasing member may resiliently bias the closer assembly 550 back toward a zero degree (0°) steering angle such that the ramp surfaces 674, 675 overlap once again. In other words, the closer assembly 550 may self-center due to the biased rotational joint 592.

Figure 10:
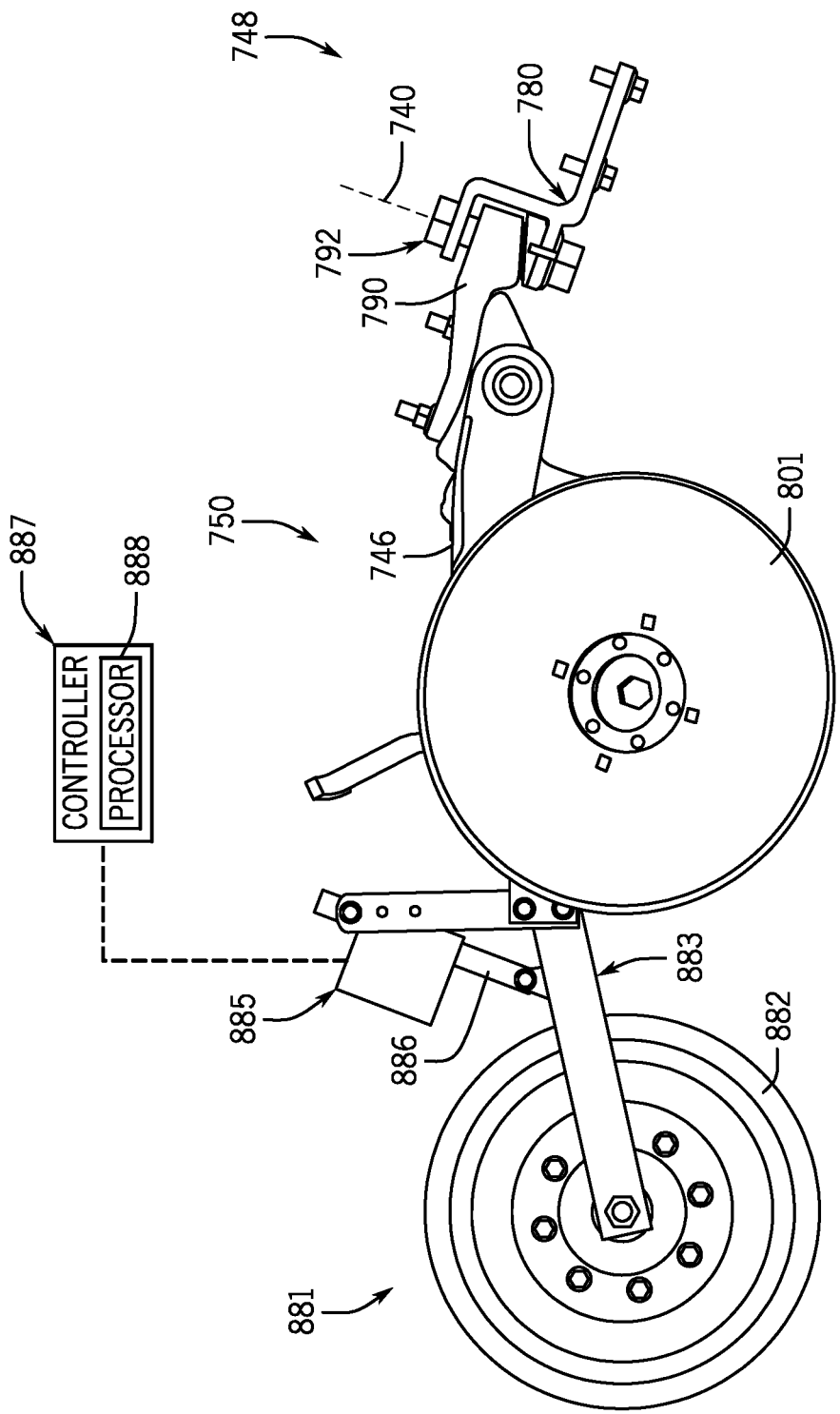
FIG. 10 is a side view of the row unit according to additional embodiments of the present disclosure.
Figure 11:
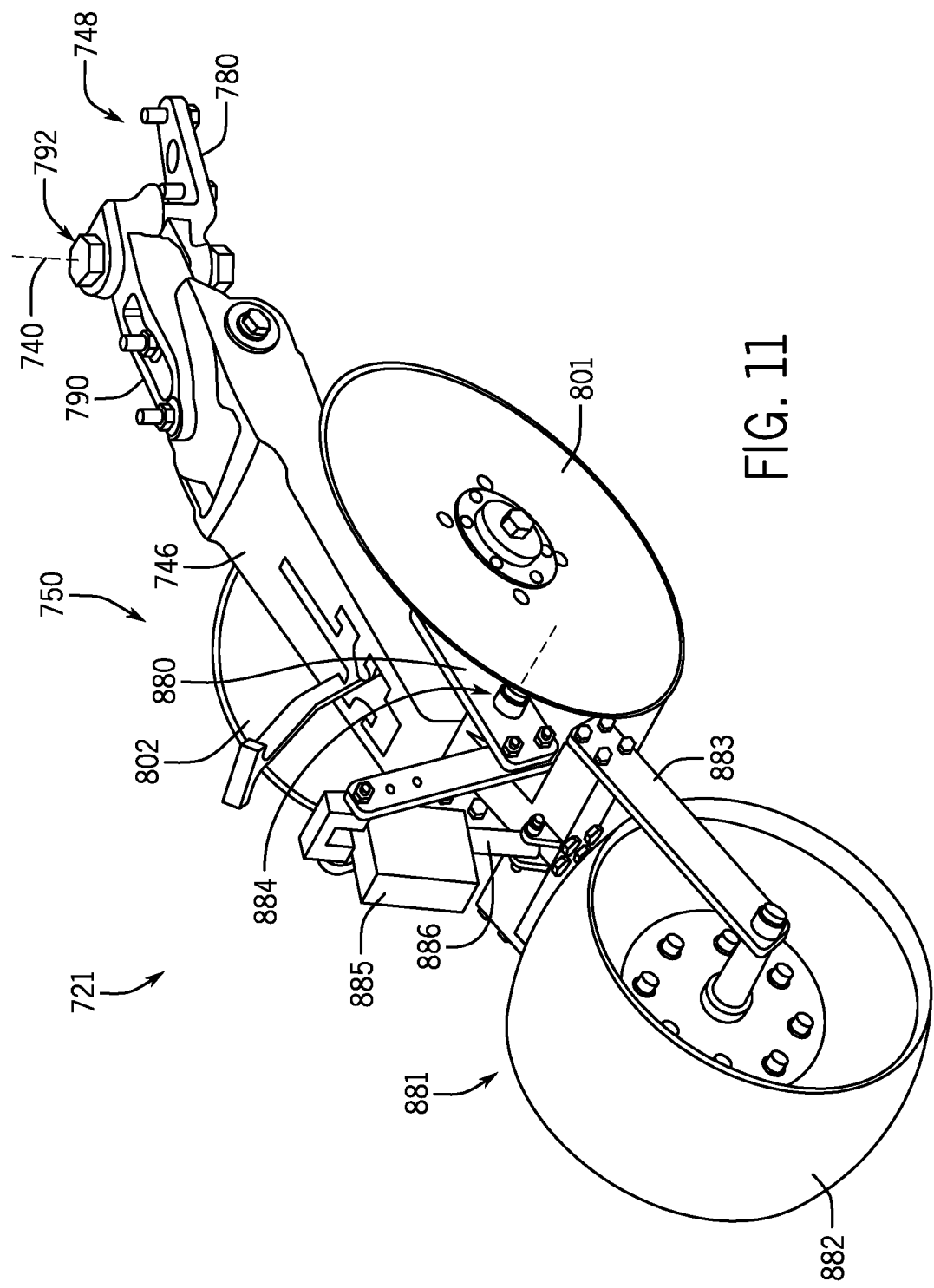
FIG. 11 is a perspective view of the row unit of FIG. 10.

Referring now to FIGS. 10 and 11, the row unit 721 of the present disclosure will be discussed according to additional embodiments. The row unit 721 of FIGS. 10 and 11 may be substantially similar to the above-described embodiments except as noted below. Components discussed above may also be combined with those discussed below. Components that correspond to those of the embodiments of FIGS. 8 and 9 will be indicated with corresponding reference numbers increased by 200.

As shown, the row unit 721 may include the forward assembly 748 and the closer assembly 750 attached at the rotational joint 792. Accordingly, the closer assembly 750 may rotate relative to the forward assembly 748 about the vertical axis of rotation 740. Specifically, the linkage 780 of the forward assembly 748 may be rotationally attached at the rotational joint 792 to the linkage 790 of the closer assembly 750.

The row unit 721 may also include a mount 880 (FIG. 11). The mount 880 may include rigid brackets that are fixed to the underside of the trailing frame 788. The first and second closer discs 801, 802 may be attached to the trailing frame 788, and the mount 880 may be disposed therebetween. The trailing frame 788 may also extend longitudinally from the trailing frame 788.

The row unit 721 may additionally include a press wheel assembly 811. The press wheel assembly 811 may include a wheel 882 and a mount 883. The mount 883 may include a collection of rigid brackets, connectors, etc. The mount 883 may be attached on one end to the hub of the wheel 882 and on the opposite end to the mount 880 (FIG. 11). The mount 883 may be rotationally attached to the mount 880 at a lateral joint 884.

In addition, the row unit 721 may include an actuator 885. The actuator 885 may be of a variety of types, such as an electric actuator, such as a motorized linear actuator. The actuator 885 may also comprise a pneumatic actuator or a hydraulic actuator without departing from the scope of the present disclosure. In some embodiments, the actuator 885 may be operatively attached to both the mount 883 and the mount 880 (FIG. 11). As shown, the actuator 885 may actuate a rod 886 to coincidentally change the angle between brackets and to ultimately change an angle of rotation between the mount 880 and the mount 883. Accordingly, as the actuator 885 actuates, the height of the wheel 882 changes which, in turn, controls the depth that the closer discs 801, 802 operate.

In addition, the work vehicle 100 may include a control system 887. The control system 887 may be configured for controlling the actuator 885. The control system 887 is shown in FIG. 10 according to example embodiments. It will be understood that FIG. 10 is a simplified representation of the control system 887 for purposes of explanation and ease of description, and FIG. 10 is not intended to limit the application or scope of the subject matter in any way. Practical embodiments of the control system 887 may vary from the illustrated embodiment without departing from the scope of the present disclosure. Also, the control system 887 may include numerous other devices and components for providing additional functions and features, as will be appreciated in the art.

The control system 887 may be wholly supported on the work vehicle 100, or the control system 887 may include components that are remote from the vehicle 100. The control system 887 may be an electronic (e.g., computerized) control system in some embodiments. In other embodiments, the control system 887 may be a hydraulic control system, a pneumatic control system, a combination control system, etc.

The control system 887 may include a processor 888. The processor 888 may comprise hardware, software, and/or firmware components configured to enable communications and/or interaction between sensor(s) of the row unit 721, the actuator 885 of the row unit 721, as well as a memory element, a user interface (U/I), etc. The processor 888 may also perform additional tasks and/or functions described in greater detail below. Depending on the embodiment, the processor 888 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processor 888 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processor 888 includes processing logic that may be configured to carry out the functions, techniques, and processing tasks associated with the operation of the control system 887. Furthermore, the steps of a method or algorithm described in connection with the embodiments disclosed herein may be embodied directly in hardware, in firmware, in a software module executed by the processor 888, or in any practical combination thereof.

In some embodiments, a user may determine a target position for the closer discs 801, 802, and the user may enter a corresponding user command with a user interface. The user may enter the command using a button, dial, voice command, joystick or other element of the user interface. The processor 888 may receive a corresponding input from the user interface, and the processor 888 may generate a command for actuating the actuator 885 according to the target position. In some embodiments, the control system 887 may also include a sensor that detects an actual position of one or more components of the closer assembly 750 and provides a feedback signal to the processor 888 for closed loop control.

Figure 12:
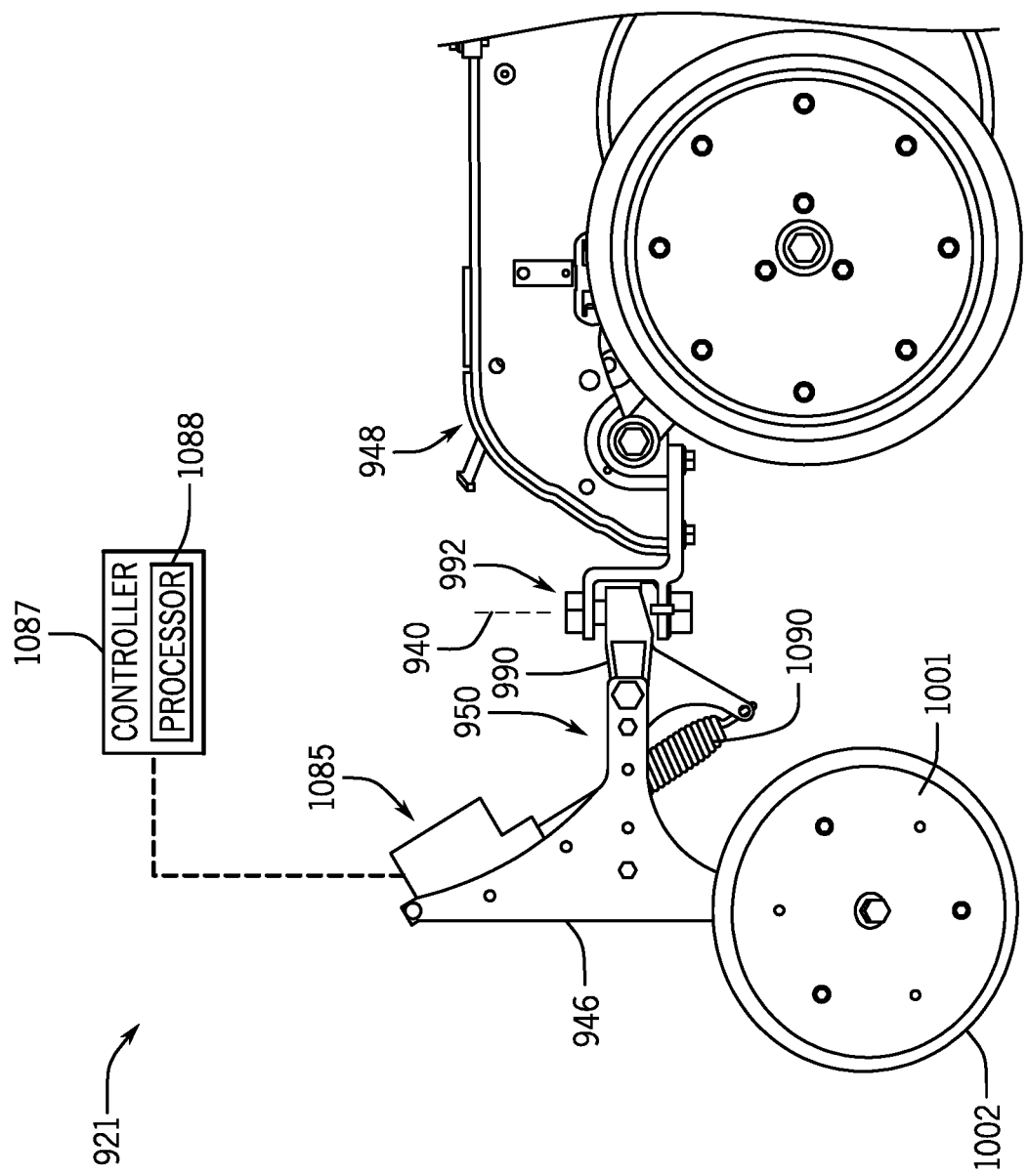
FIG. 12 is a side view of the row unit according to additional embodiments of the present disclosure.

Referring now to FIG. 12, the row unit 921 of the present disclosure will be discussed according to additional embodiments. The row unit 921 of FIG. 12 may be substantially similar to the above-described embodiments except as noted below. Components discussed above may also be combined with those discussed below. Components that correspond to those of the embodiments of FIGS. 10 and 11 will be indicated with corresponding reference numbers increased by 200.

As shown, the row unit 921 may include the forward assembly 948 and the closer assembly 950 attached at the rotational joint 992. Accordingly, the closer assembly 950 may rotate relative to the forward assembly 948 about the vertical axis of rotation 940. Specifically, the linkage 980 of the forward assembly 948 may be rotationally attached at the rotational joint 992 to the linkage 990 of the closer assembly 950.

The trailing frame 988 may be rotationally attached to the linkage 990, and at least one closer disc 1001 may be attached to the trailing frame 988. The actuator 1085 may be attached to an upper projection of the trailing frame 988 and a lower projection of the linkage 990. The actuator 1085 may include a biasing member 1090, such as a helical spring (e.g., a tension spring). The actuator 1085 may actuate to change a biasing force (e.g., tension) provided by the biasing member 1090. This may selectively change the downforce applied by the closer disc 1001 on the ground and/or the height of the closer disc 1001. The control system 1087 may also be included and may be used for controlling actuation of the actuator 1085.

Figure 13:
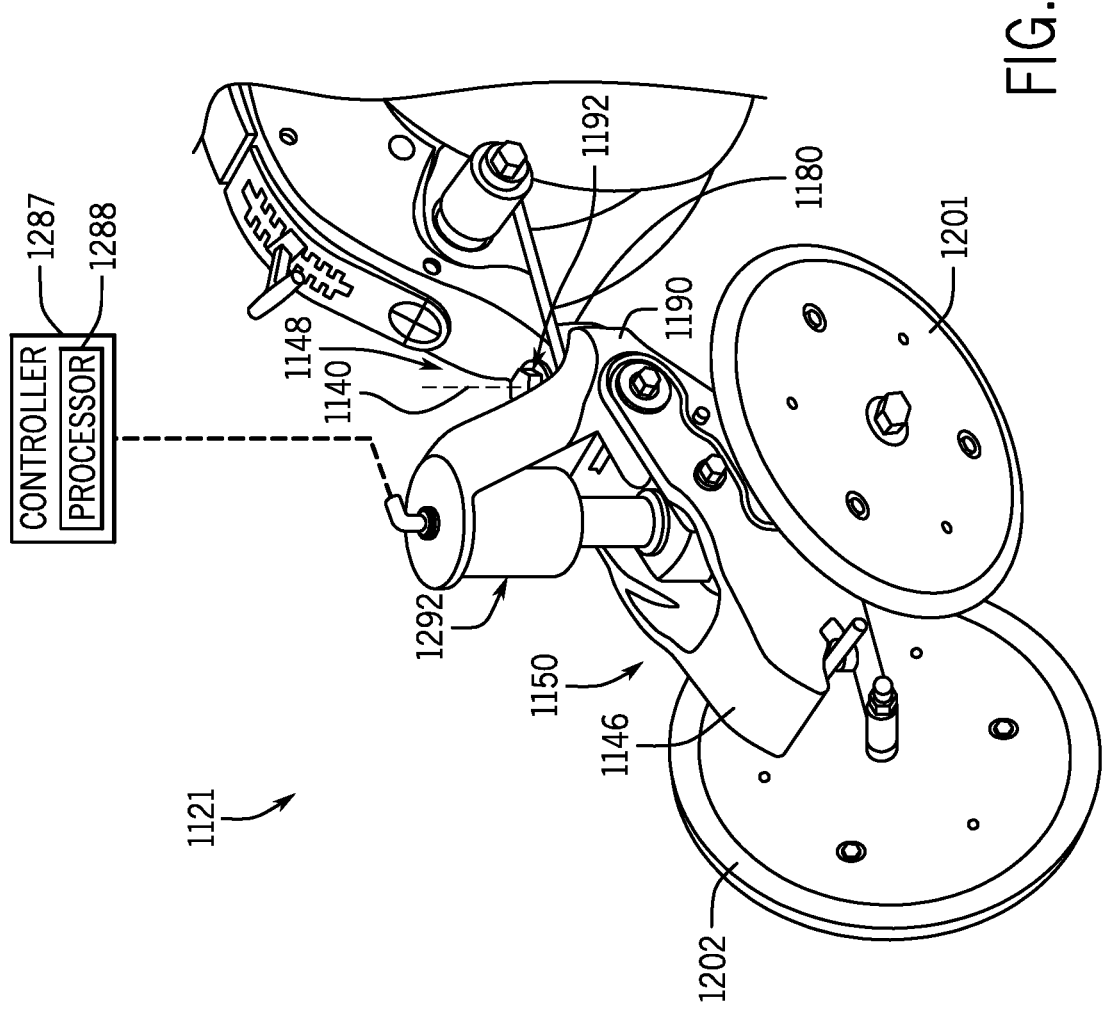
FIG. 13 is a perspective view of the row unit according to additional embodiments of the present disclosure.

Referring now to FIG. 13, the row unit 1121 of the present disclosure will be discussed according to additional embodiments. The row unit 1121 of FIG. 13 may be substantially similar to the above-described embodiments except as noted below. Components discussed above may also be combined with those discussed below. Components that correspond to those of the embodiments of FIG. 12 will be indicated with corresponding reference numbers increased by 200.

As shown, the row unit 1121 may include the forward assembly 1148 and the closer assembly 1150 attached at the rotational joint 1192. Accordingly, the closer assembly 1150 may rotate relative to the forward assembly 1148 about the vertical axis of rotation 1140. Specifically, the linkage 1180 of the forward assembly 1148 may be rotationally attached at the rotational joint 1192 to the linkage 1190 of the closer assembly 1150. The first and second closer discs 1201, 1202 may be attached to the trailing frame 988.

The actuator 1285 may be attached to an upper projection off the linkage 1190 and attached to the trailing frame 1188. The actuator 1285 may be a pneumatic actuator in some embodiments and may be attached to the processor 1288 of the control system 1287 as shown.

Also, the following examples are provided, which are numbered for easier reference.

1. A row unit for a work vehicle, the work vehicle defining a vehicle longitudinal axis, the row unit configured to be attached to the work vehicle with a plurality of other row units for movement across a field, the row unit comprising: a row unit frame including a closer frame, the closer frame defining a longitudinal axis and a transverse axis, the closer frame being supported for rotational movement about a substantially vertical steering axis to vary a turning angle between the longitudinal axis of the closer frame and the vehicle longitudinal axis; and a closer implement assembly that includes a first closer implement, a second closer implement, and a walking beam construction, the first closer implement and the second closer implement attached to opposite areas of the walking beam construction, the walking beam construction rotationally attached to the closer frame to support rotation of the closer implement assembly about the transverse axis, the first closer implement configured to move ground material into a ground opening from one side as the work vehicle moves across the field, the second closer implement configured to move ground material into the ground opening from an opposite side as the work vehicle moves across the field.

2. The row unit of example 1, further comprising an abutment member that is fixedly attached to the closer frame, wherein the abutment member is configured to abut against the closer implement assembly to limit rotational movement of the closer implement assembly about the transverse axis.

3. The row unit of example 1, wherein at least one of the first closer implement and the second closer implement includes a leading edge and a trailing edge with respect to the longitudinal axis; and wherein first closer implement is supported at a toe-out angle such that the leading edge is disposed further away laterally from the longitudinal axis of the closer frame than the trailing edge.

4. The row unit of example 3, wherein the first closer implement is disposed forward of the second closer implement along the longitudinal axis of the closer frame; and wherein the first closer implement includes the leading edge and the trailing edge.

5. The row unit of example 1, wherein the row unit frame includes a forward frame and the closer frame; wherein the forward frame is configured to be attached to a work vehicle frame of the work vehicle; wherein the closer frame is rotationally attached to the forward frame at a rotational joint, the rotational joint supporting the closer frame for rotational movement relative to the forward frame about the substantially vertical steering axis.

6. The row unit of claim 5, wherein the forward frame supports at least one of a gauge wheel and an opener implement of the row unit.

7. The row unit of example 1, wherein the walking beam construction includes a beam with a first end and a second end; wherein the first end and the second end are spaced apart along the longitudinal axis of the closer frame; wherein the first end is attached to the first closer implement and the second end is attached to the second closer implement; and further comprising a projection that projects in a downward direction from the beam, the projection configured to move an obstruction away from the beam as the work vehicle moves across the field.

8. The row unit of example 9, wherein the projection includes an attachment portion that is attached to the beam and a terminal end portion that is spaced apart from the beam; and wherein the projection is tapered between the attachment portion and the terminal end portion such that a dimension of the projection at the attachment portion is greater than the dimension of the projection at the terminal end portion.

9. A row unit for a work vehicle, the row unit configured to be attached to the work vehicle with a plurality of other row units for movement across a field, the row unit comprising: a forward frame defining a forward longitudinal axis, the forward frame configured to attach to a work vehicle frame of the work vehicle; a closer frame defining a closer longitudinal axis, the closer frame rotationally attached to the forward frame and supported for rotational movement about a substantially vertical steering axis to vary a turning angle between the closer longitudinal axis and the forward longitudinal axis; and a closer implement attached to the closer frame, the closer implement configured to move ground material into a ground opening as the work vehicle moves across the field; the closer frame supported for movement relative to the forward frame between an unrestrained position and a restrained position; the closer frame, in the unrestrained position, being supported for rotational movement about the steering axis to vary the turning angle; and wherein the closer frame, in the restrained position, is restrained at a substantially fixed turning angle.

10. The row unit of example 9, wherein the substantially fixed turning angle is a zero-degree turning angle between the closer longitudinal axis and the forward longitudinal axis.

11. The row unit of example 9, further comprising a retainer attached to one of the forward frame and the closer frame; wherein the retainer, in the unrestrained position, is disposed a clearance distance away from the other of the forward frame and the closer frame during rotation of the closer frame relative to the forward frame; and wherein the retainer, in the restrained position, abuts against the other of the forward frame and the closer frame to limit rotation of the closer frame relative to the forward frame.

12. The row unit of example 11, wherein the retainer includes a first retainer member and a second retainer member that are attached to the one of the forward frame and the closer frame; wherein the first retainer member, in the restrained position, abuts against the other of the forward frame and the closer frame to limit rotation of the closer frame in a first direction; wherein the second retainer member, in the restrained position, abuts against the other of the forward frame and the closer frame to limit rotation of the closer frame in a second direction that is opposite the first direction.

13. The row unit of example 12, wherein the first retainer member is a first projection that projects from the forward frame; and wherein the second retainer member is a second projection that projects from the forward frame.

14. The row unit of example 11, wherein the retainer is attached to the forward frame; wherein the closer frame is supported for substantially vertical movement between the restrained position and the unrestrained position relative to the forward frame; wherein, in the unrestrained position, the closer frame is disposed the clearance distance away from the retainer to allow rotation of the closer frame relative to the forward frame; and wherein, in the restrained position, the closer frame abuts against the retainer to limit rotation of the closer frame relative to the forward frame.

15. The row unit of example 14, further comprising a biasing member that biases the closer frame toward the restrained position.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A row unit for a work vehicle, the row unit configured to be attached to the work vehicle with a plurality of other row units for movement across a field, the row unit comprising:
   a forward frame defining a forward longitudinal axis, the forward frame configured to attach to a work vehicle frame of the work vehicle;
   a closer frame defining a closer longitudinal axis, the closer frame rotationally attached to the forward frame and supported for rotational movement about a substantially vertical steering axis to vary a turning angle between the closer longitudinal axis and the forward longitudinal axis; and
   a closer implement attached to the closer frame, the closer implement configured to move ground material into a ground opening as the work vehicle moves across the field;
   the closer frame supported for movement relative to the forward frame between an unrestrained position and a restrained position;
   the closer frame, in the unrestrained position, being supported for rotational movement about the steering axis to vary the turning angle; and
   wherein the closer frame, in the restrained position, is restrained at a substantially fixed turning angle.

2. The row unit of claim 1, wherein the substantially fixed turning angle is a zero-degree turning angle between the closer longitudinal axis and the forward longitudinal axis.

3. The row unit of claim 1, further comprising a retainer attached to one of the forward frame and the closer frame;
   wherein the retainer, in the unrestrained position, is disposed a clearance distance away from the other of the forward frame and the closer frame during rotation of the closer frame relative to the forward frame; and
   wherein the retainer, in the restrained position, abuts against the other of the forward frame and the closer frame to limit rotation of the closer frame relative to the forward frame.

4. The row unit of claim 3, wherein the retainer includes a first retainer member and a second retainer member that are attached to the one of the forward frame and the closer frame;
   wherein the first retainer member, in the restrained position, abuts against the other of the forward frame and the closer frame to limit rotation of the closer frame in a first direction;
   wherein the second retainer member, in the restrained position, abuts against the other of the forward frame and the closer frame to limit rotation of the closer frame in a second direction that is opposite the first direction.

5. The row unit of claim 4, wherein the first retainer member is a first projection that projects from the forward frame; and
   wherein the second retainer member is a second projection that projects from the forward frame.

6. The row unit of claim 3, wherein the retainer is attached to the forward frame;
   wherein the closer frame is supported for substantially vertical movement between the restrained position and the unrestrained position relative to the forward frame;
   wherein, in the unrestrained position, the closer frame is disposed the clearance distance away from the retainer to allow rotation of the closer frame relative to the forward frame; and
   wherein, in the restrained position, the closer frame abuts against the retainer to limit rotation of the closer frame relative to the forward frame.

7. The row unit of claim 6, further comprising a biasing member that biases the closer frame toward the restrained position.

8. The row unit of claim 7, wherein the closer frame includes a trailing frame and a linkage;
   wherein the linkage is pivotally attached to the forward frame at a rotational joint;
   wherein the biasing member is attached to the trailing frame and the linkage; and
   wherein the trailing frame is pivotally attached to the linkage and is supported for rotational movement between the restrained position and the unrestrained position.

9. The row unit of claim 1, wherein the closer implement is a first closer disc of a closer implement assembly;
   wherein the closer implement assembly further includes a second closer disc and a walking beam construction;
   wherein the first closer disc and the second closer disc are attached to opposite areas of the walking beam construction, the walking beam construction rotationally attached to the closer frame to support rotation of the closer implement assembly about a transverse axis, the transverse axis being transverse to the closer longitudinal axis, the first closer disc configured to move ground material into a ground opening from one side as the work vehicle moves across the field, the second closer disc configured to move ground material into the ground opening from an opposite side as the work vehicle moves across the field.

* * * * *